Jan. 12, 1932.   J. C. THOMSON   1,841,224
VALVE
Filed Jan. 2, 1930
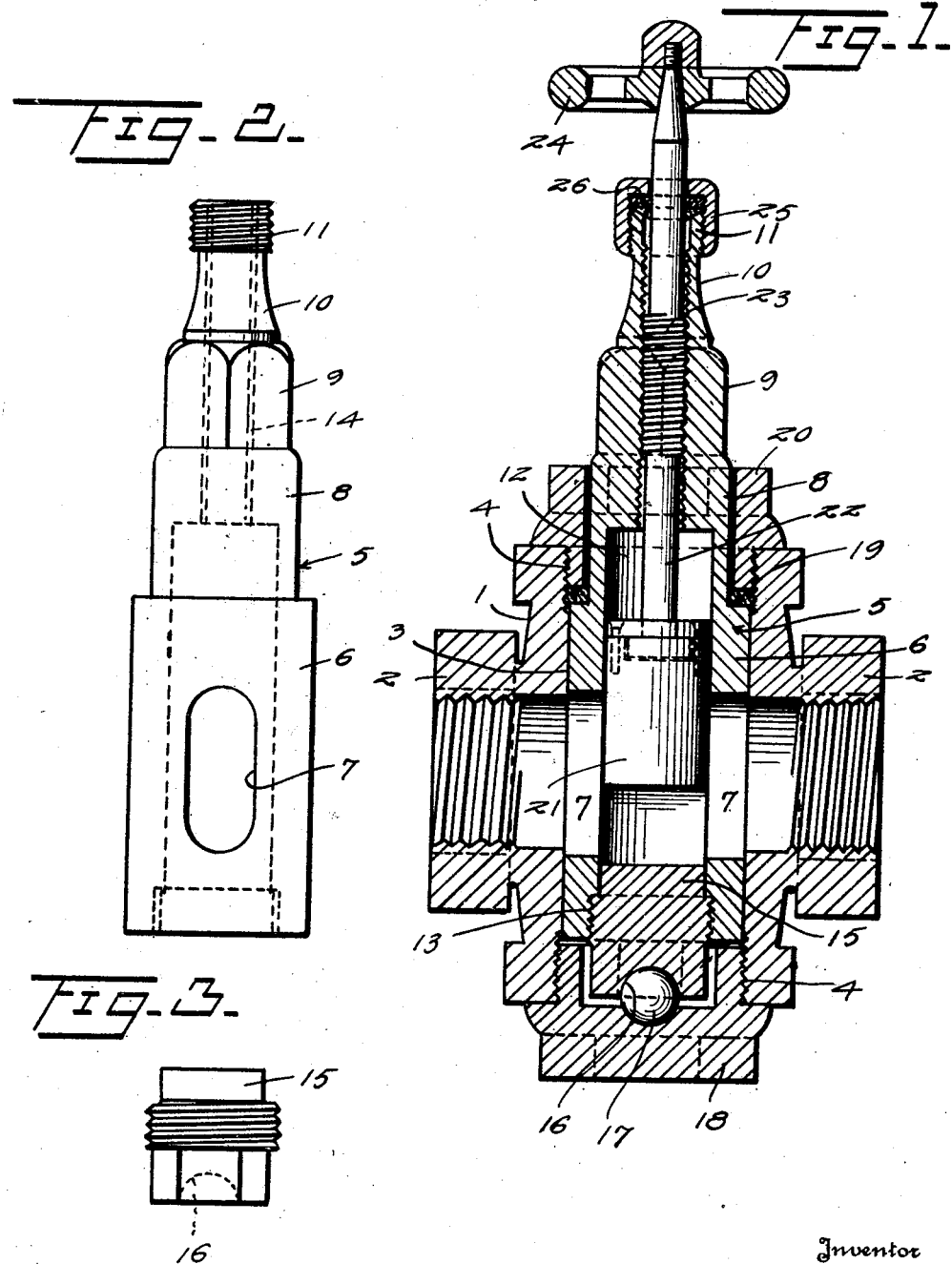

Patented Jan. 12, 1932

1,841,224

UNITED STATES PATENT OFFICE

JOSEPH CUTHBERT THOMSON, OF PALO VERDE, ARIZONA

VALVE

Application filed January 2, 1930. Serial No. 418,044.

This invention relates to improvements in shut-off and regulating valves.

The primary object of the present invention is to provide a valve structure wherein the flow of liquid therethrough may be controlled independently of the means provided for completely shutting the valve so that if the valve is used for controlling the flow of water wherein sand or other abrasive material may be no damage will be done to the contacting surfaces of that portion of the valve structure provided for completely closing the valve.

Another object of the invention is to provide a valve having two flow controlling elements adapted to be operated independently of one another, one of the elements being of a reciprocating type and employed for regulating the flow of liquid through the valve while the other element is of the rotary type and is provided for use in completely shutting the valve only.

Still another object of the invention is to provide a valve having a rotary shut-off plug wherein means is provided for compensating for wear between certain contacting surfaces.

Other objects and advantages of the present invention will become apparent as the description of the same proceeds and the invention will be best understood from a consideration of following detailed description taken in connection with the accompanying drawings forming part of this specification, with the understanding, however, that the invention is not confined to any strict conformity with the showing of the drawing but may be changed or modified so long as such changes or modifications mark no material departure from the salient features of the invention as expressed in the appended claims.

In the drawings:—

Figure 1 is a central longitudinal sectional view through a valve constructed in accordance with the present invention.

Figure 2 is a view in elevation of the rotary plug element of the valve.

Figure 3 is a view in elevation of a removable plug in the lower end of the rotary plug.

Referring more particularly to the drawing wherein like numerals of reference indicate corresponding parts thoughout the several views, the numeral 1 indicates generally the body of the valve which as shown has the threaded couplings 2 for the attachment of pipes thereto, the interior of the valve being formed to provide a cylindrical chamber 3 which is open at each end and at each end has formed in the wall thereof the threads 4.

Adapted to position in the cylindrical chamber of the valve body is a hollow rotary plug indicated as a whole by the numeral 5. This plug consists of a relatively long cylindrical lower portion 6 through which a transverse port 7 is formed, an upper intermediate circular portion 8 of smaller diameter than the portion 6 and a polygonal top portion or nut 9 which is surmounted by a reduced extension 10 the upper end of which is exteriorly threaded as indicated at 11.

The interior of the main portion 6 of the plug is as before stated hollow and is circular in outline, as indicated at 12, this hollow interior opening through the lower end of the portion 6 at which lower end the wall thereof is provided with the screw threads 13. Continuing upwardly from the circular interior or chamber 12 of the plug is a threaded bore 14.

Adapted to threadably position in the lower end of the chamber 12 is a plug 15 the lower end of which is provided with a semi-circular recess 16 in which positions a bearing ball 17. This ball is engaged by a lower cap 18 which is threaded into the lower end of the chamber 3 in the valve body as shown in Figure 1 and is formed to receive a portion of the ball as is also here shown.

When the rotary plug 5 is in place in the valve body a packing material 19 is placed about the portion 8 within the upper end of the chamber 3 and a gland nut 20 is then threaded into the upper end of this chamber about the circular portion 8 of the plug which nut forces the packing material firmly in about the plug and thus prevents leakage between the wall of the plug and the wall of the valve body chamber in which it is located.

Snugly housed in the chamber 12 of the plug is a cylindrical shut-off body 21 to the upper end of which is swivelly coupled an end of a stem 22 which extends up through the bore 14 projecting from the upper end thereof as shown. This stem is threaded as indicated at 23 through a portion of its length for engagement with the threads formed in the wall of the bore 14 and the upper end thereof is formed to receive thereon a hand wheel 24. The upper end of the stem projects through a packing nut 25 which threads onto the extension 10 packing about the stem packing material 26 which as will be readily understood prevents leakage of fluid around the stem.

From the foregoing description it will be readily seen that with a valve of the character herein described in a fluid line the flow of fluid therethrough may be readily regulated through the reciprocation of the cylindrical valve plug, the shut-off plug 5 being kept stationary with the port 7 therethrough in alignment with the coupling nipples 2. It will thus be seen that if the fluid passing through the valve contains sand or other abrasive which would injure the contacting moving surfaces no damage will be done to the surface of the portion 6 of the rotary plug. When the valve is to be closed then a wrench or other suitable tool may be connected with the polygonal portion 9 of the rotary plug and the same turned to position the port 7 at right angles to the nipples 2. In the use of the valve for the regulation of the flow of a fluid therethrough abrasion to the surface of the plug 6 will not cause any serious trouble for slight leakage about this plug will not interfere with the action of the valve when the same is to be completely shut.

Having thus described my invention, what I claim is:—

1. A valve of the character described, comprising a casing having a chamber therein open at each end and further having lateral ports opening into the chamber, a rotary plug of constant diameter throughout comprising a portion and a reduced extension at one end of the said portion, said portion being within said chamber, means at the ends of said chamber for maintaining said plug in place, said portion being hollow and having a transverse passage therethrough, the said reduced extension being formed to facilitate the engagement of a wrench therewith and having a bore therethrough communicating with the interior of the said portion, a reciprocable plug within the rotary plug adapted to close said transverse passage, a stem carried by the reciprocable plug and extending through said bore and having threaded connection with the wall thereof, means upon the outer end of said stem for rotating the same, a removable body closing the lower end of said rotary plug, and an anti-friction element interposed between said movable body and the rotary plug retaining means at the lower end of the valve chamber.

2. A valve of the character described, comprising a casing having a cylindrical chamber therein, of constant diameter throughout and open at each end and further having lateral ports opening into the chamber, a cylindrical rotary plug fitted into the chamber and having a cylindrical passage longitudinally thereof and opening through the lower end, said plug further having aligned transverse openings through the wall thereof, a body closing the lower end of said plug chamber, a cap closing the lower end of said casing chamber, an antifriction element disposed between said plug chamber closing body and said cap upon the longitudinal center of the plug serving as a support therefor, a reciprocable plug within the chamber of the first mentioned plug, said first mentioned plug having an extension upon the upper end thereof provided with a relatively small bore opening into the plug chamber and having screw threads in the wall thereof, a stem extending through said bore and having threaded connection with the screw threads thereof, a swivel connection between said stem and said reciprocable plug, and a cap engaging about the upper end of the first mentioned plug and extending into the upper end of the casing chamber, said extension being formed to facilitate the application of a wrench to the first mentioned plug.

3. A valve comprising a body having two right angularly disposed bores therethrough, an elongated cylindrical plug comprising a long portion of the same diameter throughout and a reduced extension at one end of the long portion, said long portion fitting snugly in one bore and having a bore formed therein from one end and further having a transverse passage therethrough arranged to communicate with the other of the first bores, an elongated cylindrical body snugly fitted for reciprocation in the plug bore to extend across and close the transverse passage, said reduced extension projecting beyond the outside of the body and having a threaded passage therethrough communicating with the plug bore, a stem swivelly connected at one end with the cylindrical body and extending through and threadably engaging the threads in the last mentioned passage, means for rotating the cylindrical body independently of the plug, said plug being rotatable also, means for retaining the plug against longitudinal movement in its bore, and means for closing the open end of the plug.

In testimony whereof I hereunto affix my signature.

JOSEPH CUTHBERT THOMSON.